США008223700B2

United States Patent
Ding et al.

(10) Patent No.: US 8,223,700 B2
(45) Date of Patent: Jul. 17, 2012

(54) FILTERING AND GUARD BAND FOR NON-SYNCHRONIZED TRANSMISSION

(75) Inventors: Yinong Ding, Plano, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1024 days.

(21) Appl. No.: 12/007,171

(22) Filed: Jan. 7, 2008

(65) Prior Publication Data

US 2008/0240028 A1    Oct. 2, 2008

Related U.S. Application Data

(60) Provisional application No. 60/879,507, filed on Jan. 8, 2007.

(51) Int. Cl.
*H04W 4/00* (2009.01)
*H04B 7/216* (2006.01)
*H04J 3/00* (2006.01)

(52) U.S. Cl. .................. 370/329; 370/335; 370/336

(58) Field of Classification Search ............... 370/329
See application file for complete search history.

(56) References Cited

U.S. PATENT DOCUMENTS

| | | | | |
|---|---|---|---|---|
| 5,909,436 | A * | 6/1999 | Engstrom et al. | 370/343 |
| 2002/0114270 | A1 * | 8/2002 | Pierzga et al. | 370/208 |
| 2005/0286409 | A1 * | 12/2005 | Yoon et al. | 370/210 |
| 2007/0230600 | A1 * | 10/2007 | Bertrand et al. | 375/260 |
| 2008/0090528 | A1 * | 4/2008 | Malladi | 455/70 |
| 2008/0240285 | A1 * | 10/2008 | Han et al. | 375/295 |
| 2008/0318567 | A1 * | 12/2008 | Popovic et al. | 455/422.1 |

* cited by examiner

Primary Examiner — Jeffrey Pwu
Assistant Examiner — Shaq Taha

(57) ABSTRACT

A wireless terminal capable of communicating with a wireless communication system comprised of a plurality of wireless terminals and a plurality of base stations. The wireless terminal selects a sequence from a group of certain sequences for random access. At least one sub-carriers on an uplink channel including at least one data channel is allocated for at least one random access channel. Each data channel includes a continuous set of data sub-carriers. The wireless terminal then filters the at least one random access channel by applying a Raised Cosine filter, maps the selected sequence to the at least one random access channel to generate a random access channel signal, and transmits the random access channel signal to a base station.

20 Claims, 9 Drawing Sheets

FILTERING AND GUARD BAND FOR NON-SYNCHRONIZED TRANSMISSION

CLAIM OF PRIORITY

This application makes reference to, incorporates the same herein, and claims all benefits accruing under 35 U.S.C. §119 from a provisional application earlier filed in the U.S. Patent & Trademark Office on 8 Jan. 2007 and there duly assigned Ser. No. 60/879,507.

BACKGROUND OF THE INVENTION

1. Field of the Invention

The present invention relates to a method for non-synchronized transmission.

2. Description of the Related Art

A random access procedure is used when a mobile station or a User Equipment (UE) turns on the power and need to access the wireless system. The random access procedure can be classified into two categories: non-synchronized random access, and synchronized random access.

The non-synchronized access is used when the UE is not uplink time-synchronized with the base station. This may happen when a UE turns on from a sleep mode or when a UE loses uplink timing synchronization. The non-synchronized access allows the base station (i.e., Node B) to estimate, and, if needed, adjust the UE transmission timing to within a fraction of a cyclic prefix. When a base station receives a random access sequence from a mobile station successfully, the base station sends the information on the successful sequence along with the timing advance (TA) information. The mobile station can then determine if its random access attempt has been successful by matching the sequence number that the mobile station used for asynchronous random access with the sequence number information received from the base station. If the sequence number matches, the mobile station assumes that its random access attempt has been successful, and the mobile station then uses the TA information received along with the sequence ID (i.e., SEQ#) to adjust its uplink timing. After the mobile station has acquired uplink timing synchronization, the mobile station can send uplink scheduling or resource request.

An uplink (UL or U/L) is the portion of a communications link used for the transmission of signals from a User Equipment to a base station. The uplink communication channel is often divided into a number of sub-bands, they are used by a User Equipment (UE) or User Equipments to transmit uplink data. In certain time slots, some of the sub-bands are used for uplink random access. In this case, these sub-bands are called random access channels (RACH's). The uplink data transmissions are synchronized, i.e. the transmission timings of uplink signals are controlled by the Node B (base station) in such a manner that timing offsets between different UEs are within a fraction of a cyclic prefix. In Third Generation Partnership Project Long Term Evolution (3GPP-LTE), the uplink is a Discrete Fourier Transform Orthogonal Frequency Division Multiple Access (DFT-OFDMA) system. It is also referred to as Single Carrier Frequency Division Multiple Access (SC-FDMA) system. Portion of the uplink channel could be allocated as RACH. The RACH signal is constructed from random sequences. These sequences are low bandwidth in nature, and they are often transmitted non-synchronously with the data.

Contemporarily, there may be narrow or non-existent guard band and channel filtering between the data sub-bands and the RACH sub-band(s). Therefore, interference may occur between the data sub-bands and the RACH sub-band(s).

SUMMARY OF THE INVENTION

It is therefore an object of the present invention to provide an improved method and an improved system for non-synchronized transmission.

It is another object of the present invention to provide an improved method for non-synchronized transmission to reduce interference between random access channels and data channels.

It is a further object of the present invention to provide an improved method for non-synchronized transmission to maximize the random access channel processing gain and to efficiently use the frequency resources.

According to one aspect of the present invention, a method for a wireless terminal to access a wireless communication system which includes a plurality of wireless terminals and a plurality of base stations is provided. According to the method, first, a sequence is selected from a group of certain sequences for random access. Then, at least one sub-carriers on an uplink channel including at least one data channel is allocated for at least one random access channel. Each data channel includes a continuous set of data sub-carriers. The at least one random access channel is filtered by applying a Raised Cosine filter. The selected sequence is mapped to the at least one random access channel to generate a random access channel signal which is subsequently transmitted to a base station.

The Raised Cosine filter may have a roll-off coefficient of approximately 0.12.

When more than one random access channel comprising a continuous set of frequency sub-carriers, two guard bands may be inserted at each side of the combination of the random access channel signals. Each of the two guard bands may be composed of a continuous set of data sub-carriers. Then a combination of the two guard bands and the random access channel signals may be filtered by applying the Raised Cosine filter.

The group of certain sequences may be constructed from one of a Zadoff-Chu sequence and a Generalized Chirp-Like sequence.

According to another aspect of the present invention, a wireless terminal capable of communicating with a wireless communication system including a plurality of wireless terminals and a plurality of base stations is provided. The wireless terminal selects a sequence from a group of certain sequences for random access. The wireless terminal allocates at least one sub-carriers on an uplink channel including at least one data channel for at least one random access channel. Each data channel includes a continuous set of data sub-carriers. The wireless terminal filters the at least one random access channel by applying a Raised Cosine filter. Then, the wireless terminal maps the selected sequence to the at least one random access channel to generate a random access channel signal which is subsequently transmitted to a base station.

According a further aspect of the present invention, a base station capable of communicating with a wireless terminal in a wireless communication system including a plurality of wireless terminals and a plurality of base stations is provided. The base station instructs the wireless terminal to select a sequence from a group of certain sequences for random access; to allocate at least one sub-carriers on an uplink channel including at least one data channel for at least one random access channel, with each data channel including a continuous set of data sub-carriers; to filter the at least one random access channel by applying a Raised Cosine filter; to map the selected sequence to the at least one random access channel to generate a random access channel signal; and to transmit the a random access channel signal to a base station.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A random access procedure is used when a mobile station or a User Equipment (UE) turns on the power and need to access the wireless system. The random access procedure can be classified into two categories: non-synchronized random access, and synchronized random access.

Figure 1:
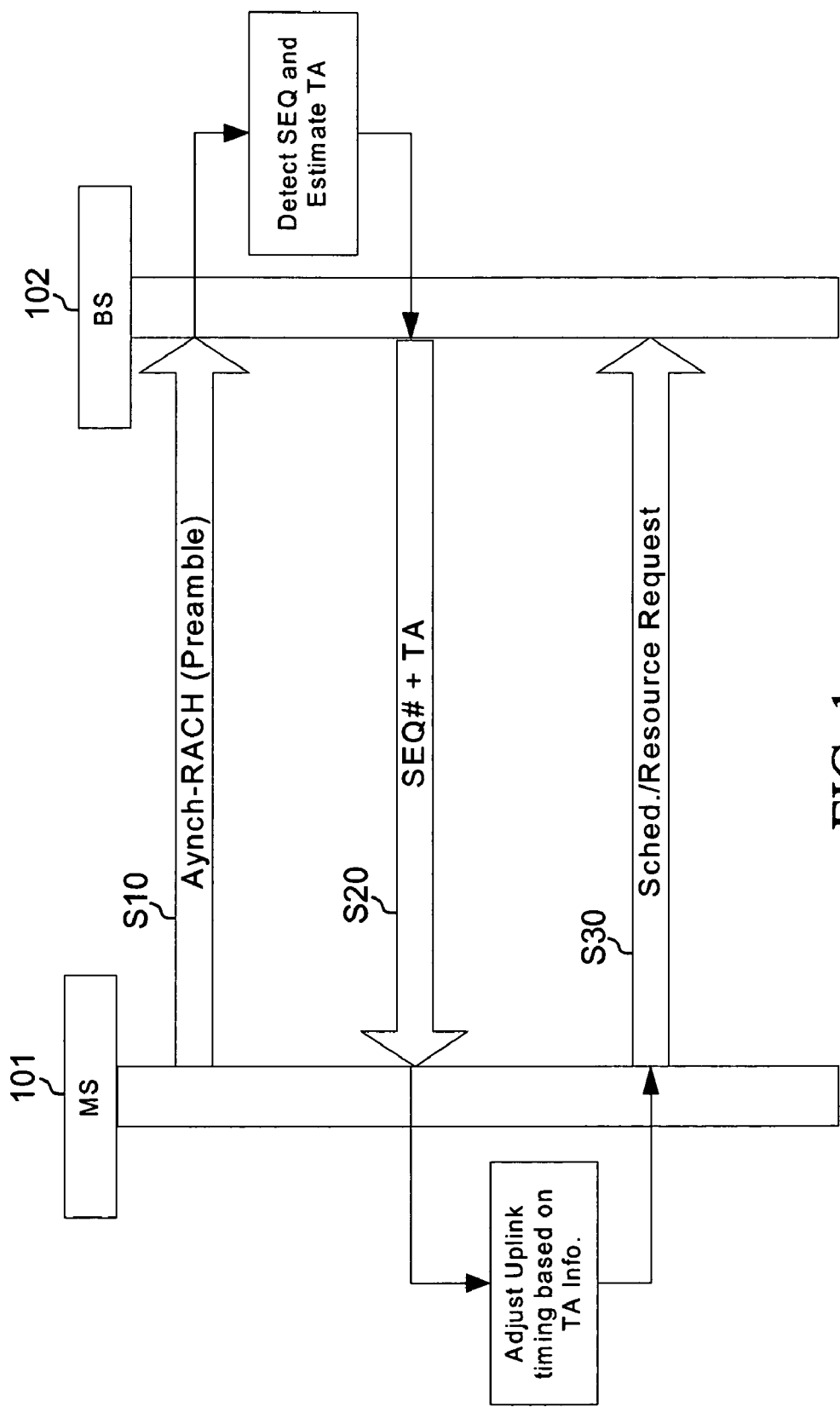
FIG. 1 is a diagram illustrating an example of random access procedure.

The non-synchronized access is used when the UE is not uplink time-synchronized with the base station. This may happen when a UE turns on from a sleep mode or when a UE loses uplink timing synchronization. The non-synchronized access allows the base station (i.e., Node B) to estimate, and, if needed, adjust the UE transmission timing to within a fraction of a cyclic prefix. FIG. 1 is a flow diagram illustrating a random access procedure. As shown in FIG. 1, when a base station 102 receives a random access sequence from a mobile station 101 successfully (S10), base station 102 sends the information on the successful sequence (i.e., SEQ#) along with the timing advance (TA) information (S20). Mobile station 101 can then determine if its random access attempt has been successful by matching the sequence number that mobile station 101 used for asynchronous random access with the sequence number information received from base station 102. If the sequence number matches, mobile station 101 assumes that its random access attempt has been successful, and mobile station 101 then uses the TA information received along with the sequence ID (i.e., SEQ#) to adjust its uplink timing. After mobile station 101 has acquired uplink timing synchronization, mobile station 101 can send uplink scheduling or resource request (S30).

In general, to meet coverage requirement in non-synchronized random access, only the preamble is transmitted. The preamble is selected from a predefined set of sequences. Also, the preamble waveforms should have good detection probability while maintaining low false alarm rate, low collision probability, low peak-to-average power ratio (PAPR), and allow accurate timing estimation. Some examples of sequences that meet these requirements are Zadoff-Chu and Generalized Chirp-Like sequences. These sequences have advantage relative to pseudo random (PN) sequences due to their low PAPR property which is important for uplink transmissions in a wireless system due to limited transmit power of the mobile stations.

The Zadoff-Chu (ZC) sequence of length N is defined as $$g_p(n) = \begin{cases} e^{-j\frac{2\pi 1}{M2}pn^2} & \text{when } N \text{ is even} \\ e^{-j\frac{2\pi 1}{M2}pn(n+1)} & \text{when } N \text{ is odd} \end{cases} \quad (1)$$

$$n = 0, 1, \ldots, N-1$$

where p, the sequence index, is relatively prime to N. That is, the only common divisor for p and N is 1. For a fixed p, the Zadoff-Chu (ZC) sequence has ideal periodic auto-correlation property (i.e. the periodic auto-correlation is zero for all time shift other than zero). For different p, ZC sequences are not orthogonal, but exhibit low cross correlation. If the sequence length N is selected as a prime number, there are N−1 different sequences with periodic cross-correlation of. 1/√N between any two sequences regardless of time shift.

In summary, with Zadoff-Chu sequence, N−1 different sequences with fixed periodic cross-correlation are available to be used as preambles, provided that N is a prime number. In addition, each of the sequence has ideal periodic auto-correlation property.

The Generalized Chirp-Like (GCL) sequence of length N is defined as:

$$c(n)=g_p(n)b(n \bmod m), n=0,1,\ldots,N-1 \quad (2)$$

with the sequence length N satisfying the relationship N=sm² where s and m are positive integers. The carrier sequence $g_p(n)$ is the Zadoff-Chu sequence of length N. The sequence index p must be a relative prime to N. To provide a set of orthogonal GCL sequences, a common Zadoff-Chu sequence is modulated by m different sequences $\{b_i(k)\}$, i=0, ..., m−1. Obviously, the Zadoff-Chu sequence is one example of a GCL sequence where the modulating sequence comprises of all ones. In summary, with GCL sequence, wm different sequences are available to be used as preambles, where w is the number of available Zadoff-Chu sequences of length N. In addition, for each of the w Zadoff-Chu carrier sequence, there are m different GCL sequences with a zero correlation zone of length sm-1.

Figure 2:
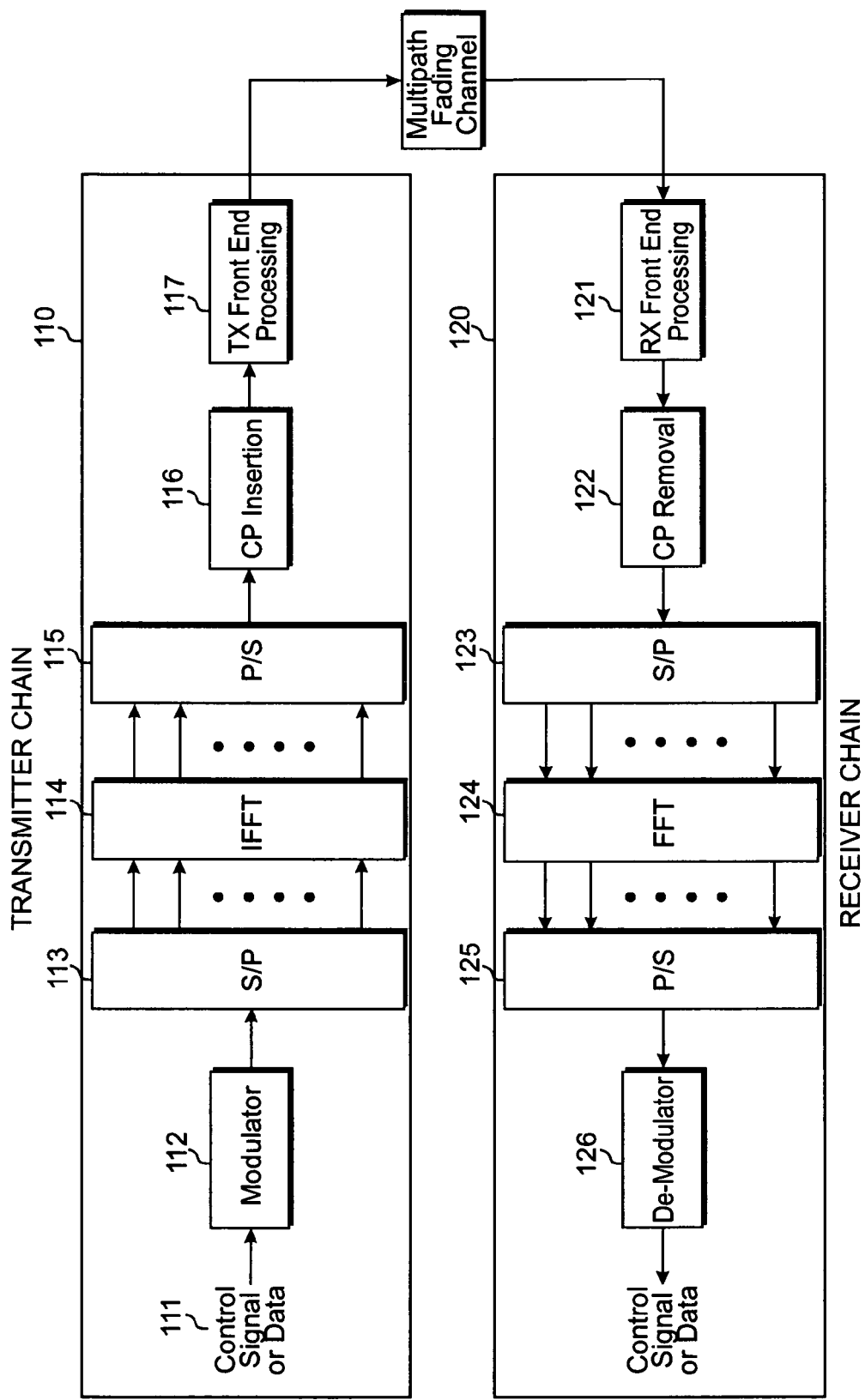
FIG. 2 is an illustration of an Orthogonal Frequency Division Multiplexing (OFDM) transceiver chain suitable for the practice of the principles of the present invention.

FIG. 2 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

Figure 3:
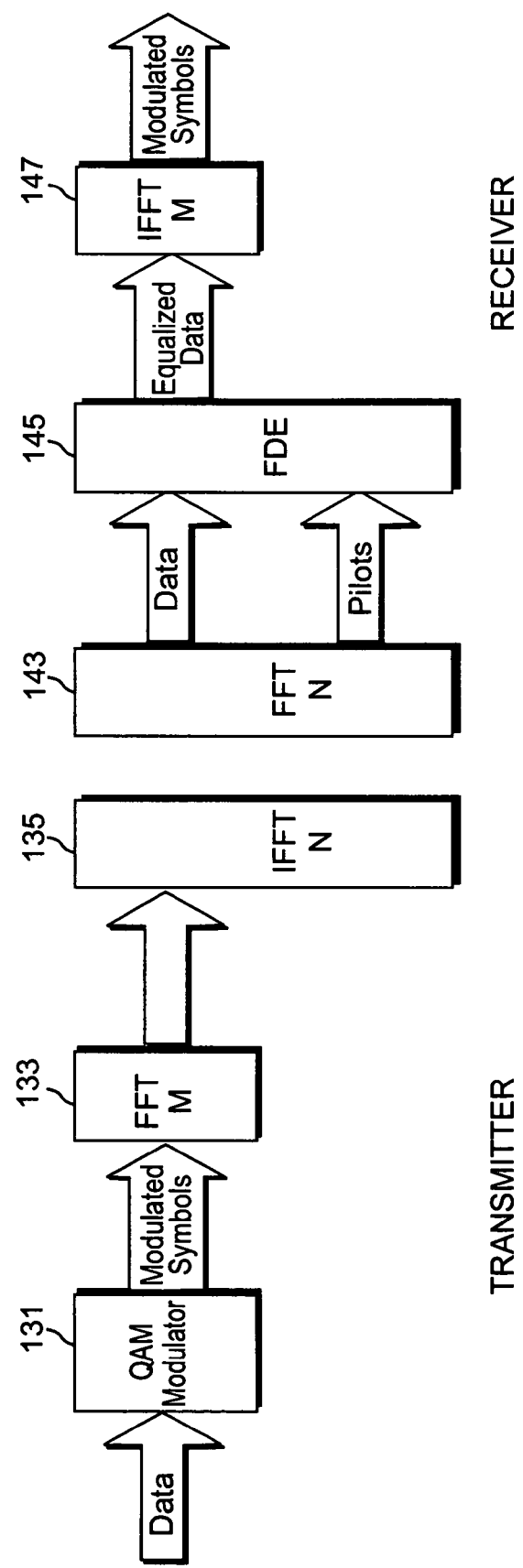
FIG. 3 is a block diagram of a transmitter and a receiver for a discreet Fourier transform (DFT) spread orthogonal frequency division multiplexing system.

In a DFT-spread OFDM system, the data to be transmitted is first modulated by a QAM Modulator 131. The QAM modulated symbols are FFT-pre-coded by a FFT unit 133 before mapping into IFFT unit 135 as shown in FIG. 3. The subsequent signal processing is similar to the transmitter in the example as shown in FIG. 2, and thus the explanation thereof is omitted. At the receiver, the received signal is processed similarly as in the receiver shown in FIG. 1 until the FFT operation by FFT unit 143. Frequency-domain equalization (FDE) is performed by a FDE unit 145 after the FFT operation. An IFFT operation is then performed by IFFT unit 147 on the equalized symbols in order to obtain the data modulated symbols.

Figure 4:
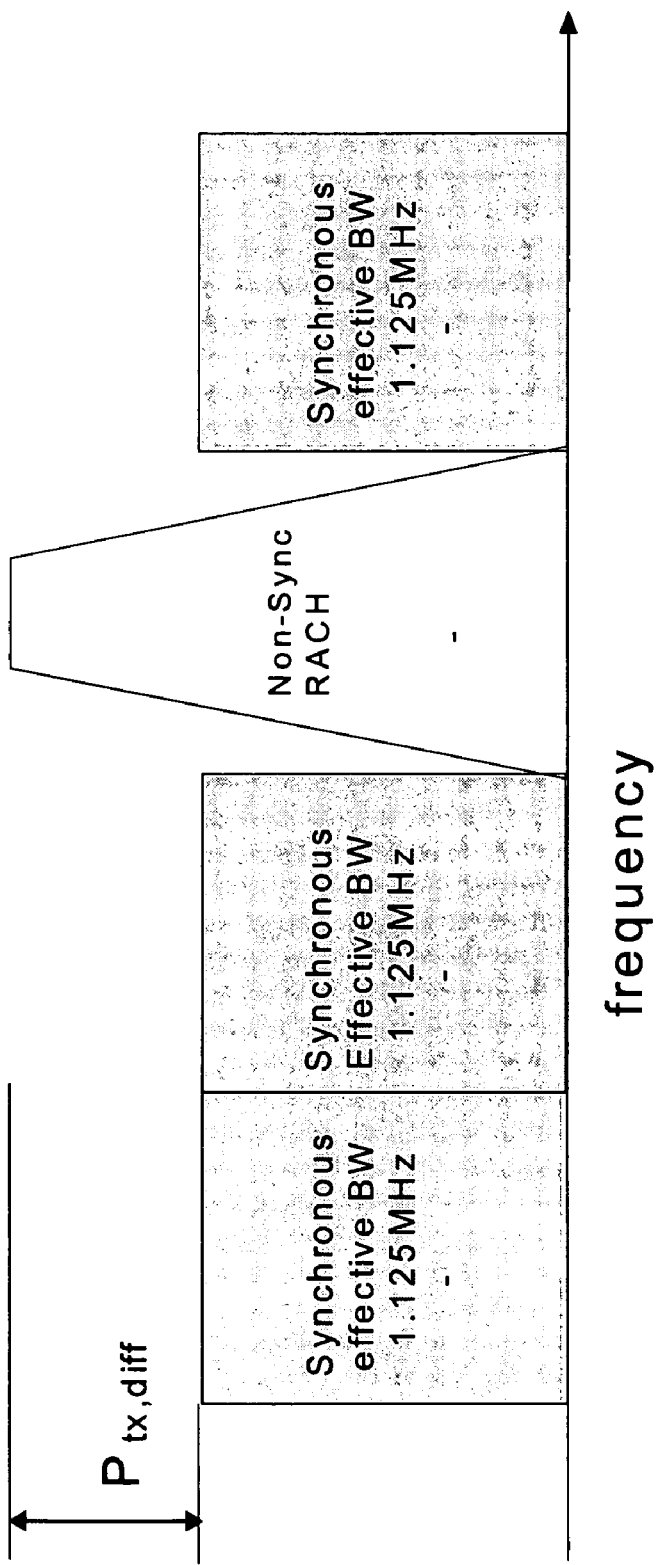
FIG. 4 illustrates a frequency allocation of data sub-carriers and random access channel (RACH) in a five MHz uplink channel.

The uplink communication channel is often divided into a number of sub-bands, they are used by a UE or UEs to transmit uplink data. In certain time slots, some of the sub-bands are used for uplink random access. These sub-bands are called random access channels (RACH's). The allocation of data sub-carriers and RACH for a 5-MHz uplink channel is illustrated in FIG. 4. The uplink data transmissions are synchronized, that is, the transmission timings of uplink signals are controlled by the Node B (base station) in such a manner that timing offsets between different UEs are within a fraction of the cyclic prefix. Portion of the uplink channel could be allocated as RACH. The RACH signal is constructed from Zadoff-Chu sequences. These sequences are low bandwidth in nature, and they are often transmitted non-synchronously with the data. In FIG. 4, $P_{tx,diff}$ is the power difference between synchronous data transmission and asynchronous RACH. A positive value for $P_{tx,diff}$ means that RACH power is higher than the data power. A negative value for $P_{tx,diff}$ means that data power is higher than the RACH power.

The present invention discloses schemes that reduce or eliminate interference of the non-synchronous Random Access Channel (RACH) signal with its neighboring data sub-carriers.

In one embodiment according to the principles of the present invention, a Root Raised Cosine filter is applied to the RACH before the RACH signal is transmitted. The Raised Cosine filter is a particular electronic filter, which is frequently used for pulse-shaping in digital modulation due to its ability to minimize intersymbol interference (ISI). Its name stems from the fact that the non-zero portion of the frequency spectrum of the simplest form of the filter is a cosine function, "raised" up to sit above the frequency (horizontal) axis. The frequency-domain description of the Raised Cosine filter is given by:

$$H(f) = \begin{cases} T, & |f| \leq \frac{1-\beta}{2T} \\ \frac{T}{2}\left[1 + \cos\left(\frac{\pi T}{\beta}\left[|f| - \frac{1-\beta}{2T}\right]\right)\right], & \frac{1-\beta}{2T} < |f| \leq \frac{1+\beta}{2T} \\ 0 & \text{otherwise} \end{cases} \quad (3)$$

where $\beta$ is a roll-off coefficient, and $0 \leq \beta \leq 1$, and T is the reciprocal of a symbol rate.

Figure 5A:
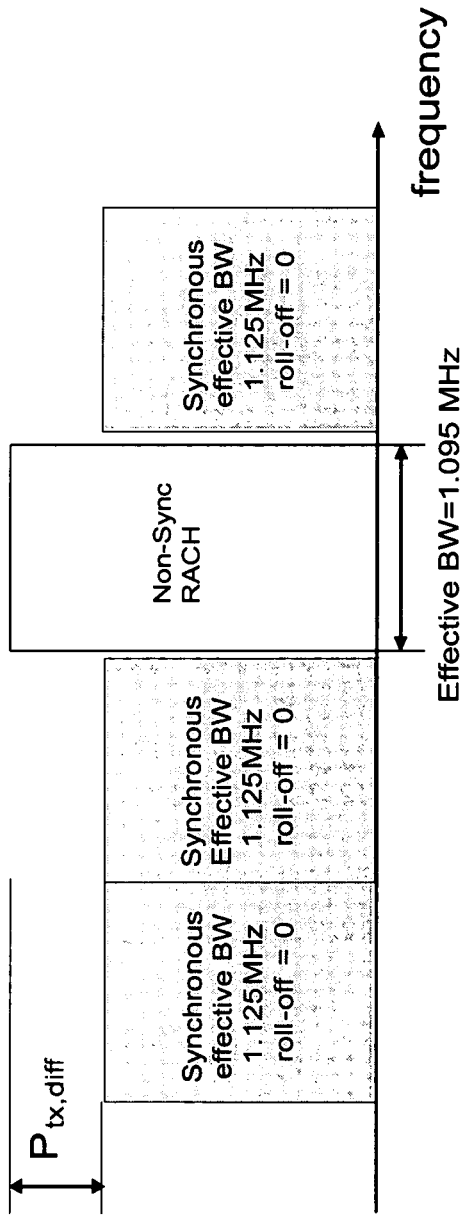
FIG. 5A illustrates a 5 MHz uplink channel before channel filtering.
Figure 5B:
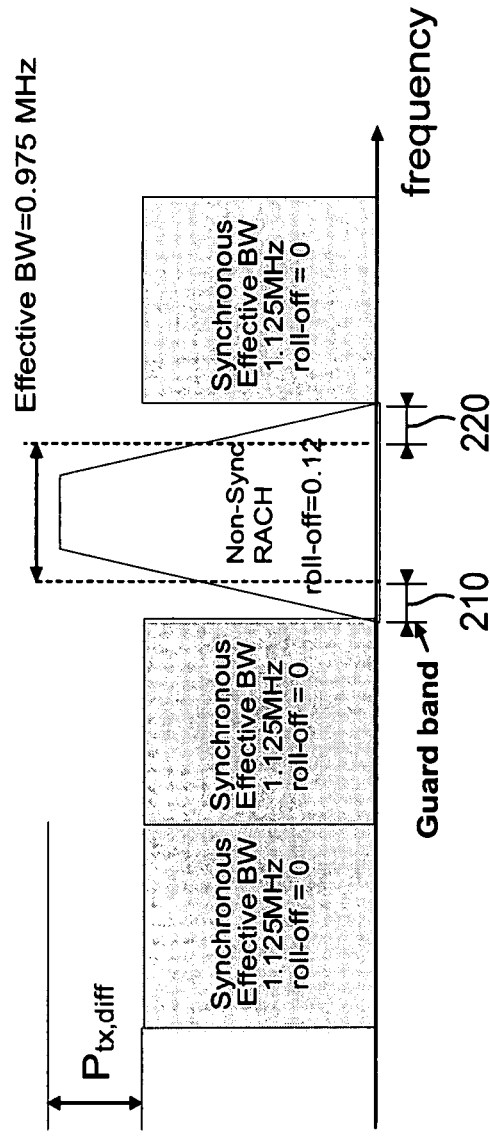
FIG. 5B illustrates a 5 MHz uplink channel after the application of the Raised Cosine filter with a roll-off coefficient of 0.12 in accordance with an embodiment of the principles of the present invention.

One of such schemes is shown in FIGS. 5A and 5B, where a root raised-cosine filter with a roll-off coefficient of 0.12 is applied to the non-synchronous RACH signal. FIG. 5A shows a 5-MHz uplink channel before the application of a channel filtering, i.e., the Raised Cosine filter. The effective bandwidth of the RACH is 1.095 MHz. FIG. 5B shows a 5-MHz uplink channel after the application of the Raised Cosine filter with a roll-off coefficient being set to 0.12 in accordance with an embodiment of the principles of the present invention. With the application of the Raised Cosine filter, the effective bandwidth of the RACH signal is reduced from 1.095 MHz to 0.975 MHz, effectively creating a guard band 210, 220 of 60 kHz wide at each side of the random access channel as shown in FIG. 5B. Here, guard bands 210 and 220 are part of the RACH signal. We notice that application of channel filtering with a raised cosine filter removes or eliminates the interference between the RACH and its neighboring data sub-carriers. The application of channel filtering with a Raised Cosine filter also reduces the effective bandwidth of the RACH preamble and thus reduces the RACH processing gain.

Figure 6:
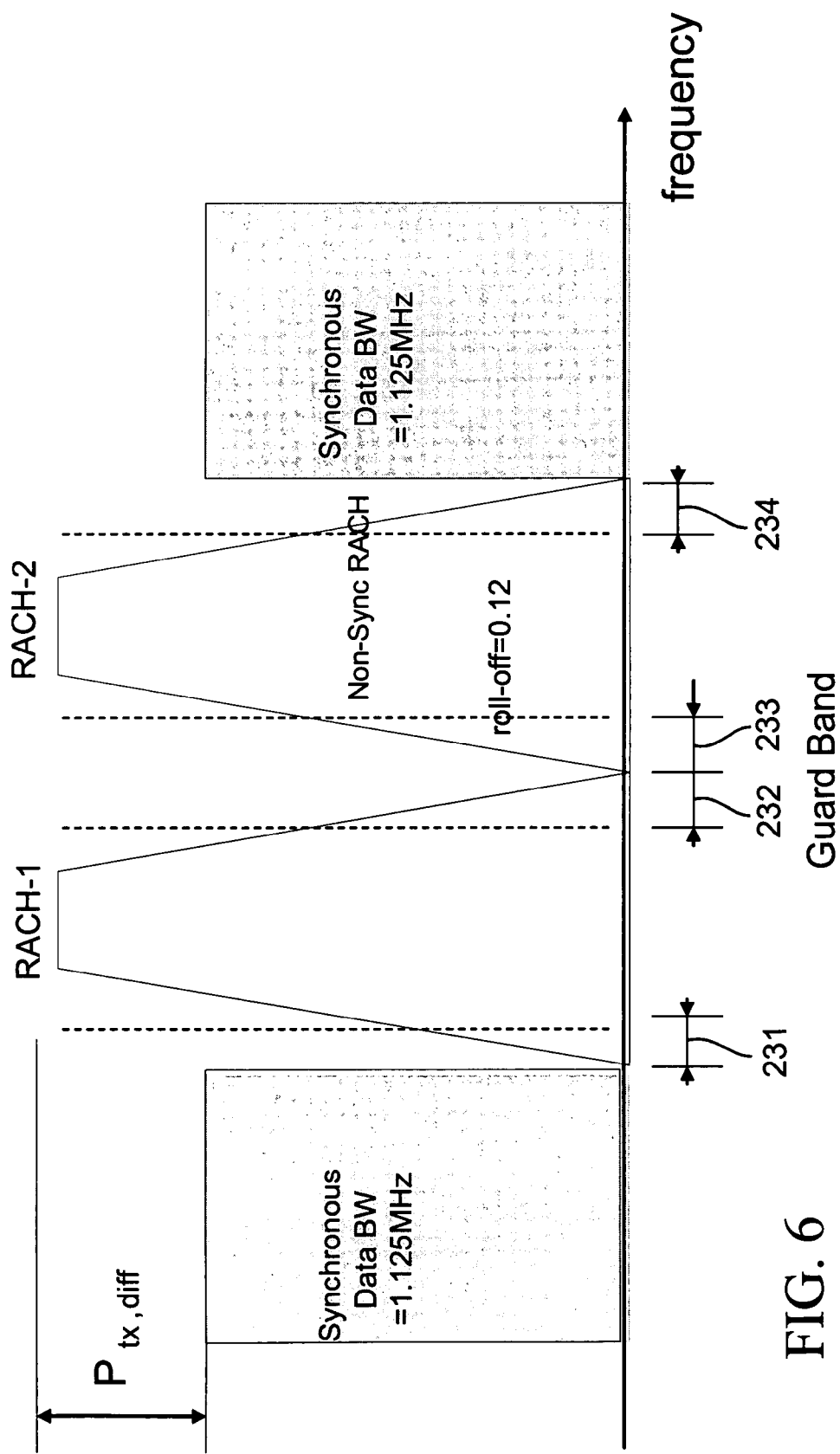
FIG. 6 illustrates a scheme of inserting guard bands and applying channel filtering for each of the random access channels as an comparative example.

When more than one RACH is allocated in the uplink channel, applying channel filtering on each of the random access channels with raised cosine filters may result in many unnecessary guard bands. As shown in FIG. 6, two random access channels are consecutively allocated in the uplink channel. The channel filtering is applied to each random access channel with the two guard bands. As a result, four guard bands 231, 232, 233, 234 are generated, with two guard bands 232 and 233 being located between the two random access channels. These two guard bands 232 and 233 located between the two random access channels are unnecessary, and may result in ineffective use of frequency resources.

Figure 7:
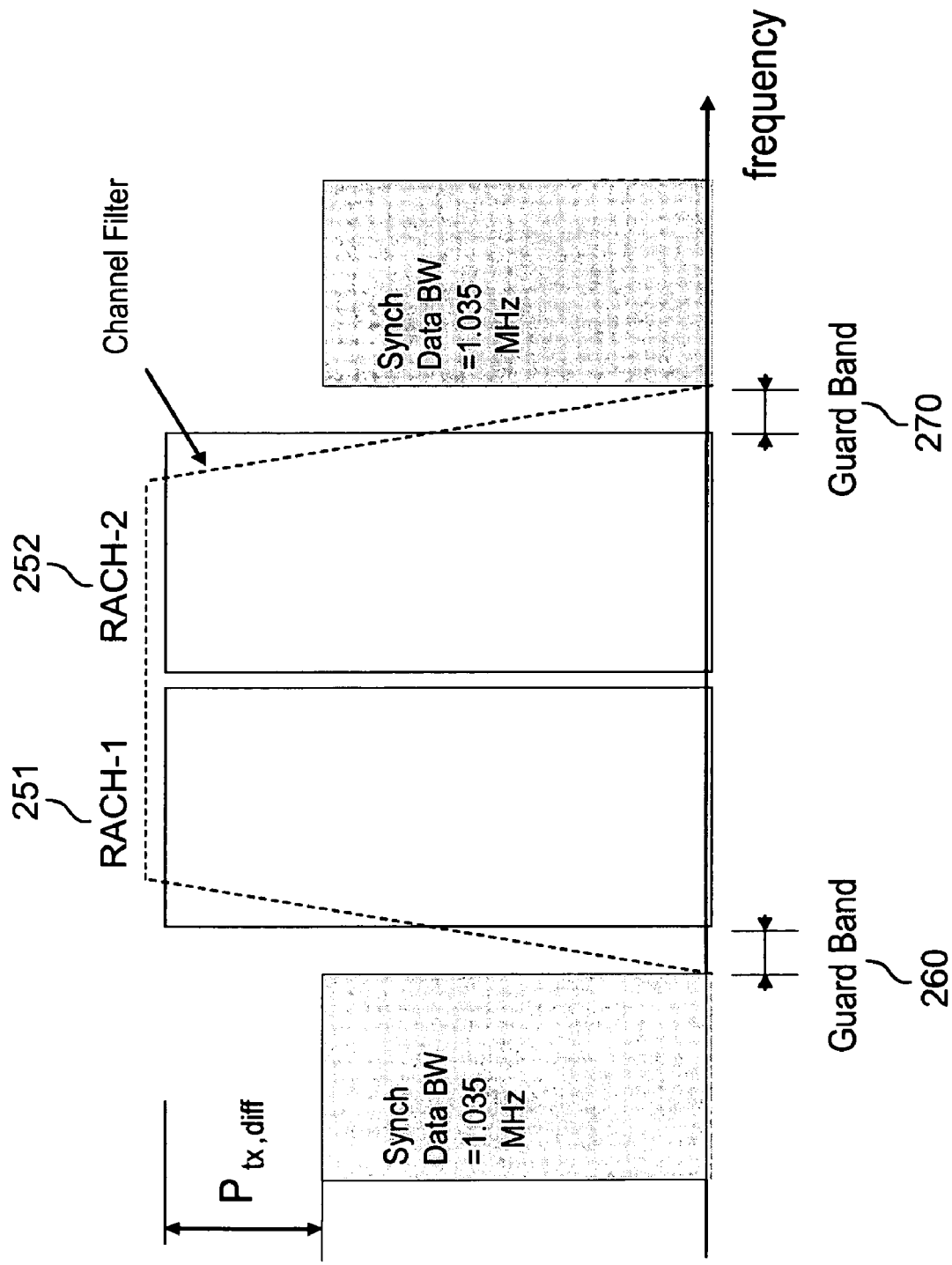
FIG. 7 illustrates a uplink channel using data sub-carriers around the random access channel as guard bands, and applying the Raised Cosine filter in accordance with an embodiment of the principles of the present invention.

To avoid this ineffective use of frequency resources, and to restore the RACH processing gain, another embodiment according to the principles of the present invention uses the neighboring data sub-carriers as guard band and keeps the RACH signal bandwidth unchanged. This scheme is illustrated in FIG. 7 for the case that two random access channels are allocated. For this scheme to work, random access channels must be allocated consecutively. As shown in FIG. 7, two random access channels RACH-1 251 and RACH-2 252 are allocated consecutively in the uplink channel. A guard band 260 composed of data subcarriers is inserted at the left side of random access channel RACH-1 251, and another guard band 270 composed of data subcarriers is inserted at the right side of random access channel RACH-2 252. A single channel filtering is performed on the combination of guard band 260, two random access channels RACH-1 251 and RACH-2 252, and guard band 270 using a Raised Cosine filter with a roll-off coefficient of 0.12. Comparing the scheme shown in FIG. 7 and the scheme shown in FIG. 6, the bandwidth of the data sub-band has been reduced from 1.125 MHz to 1.035 MHz.

Figures 8A, 8B:
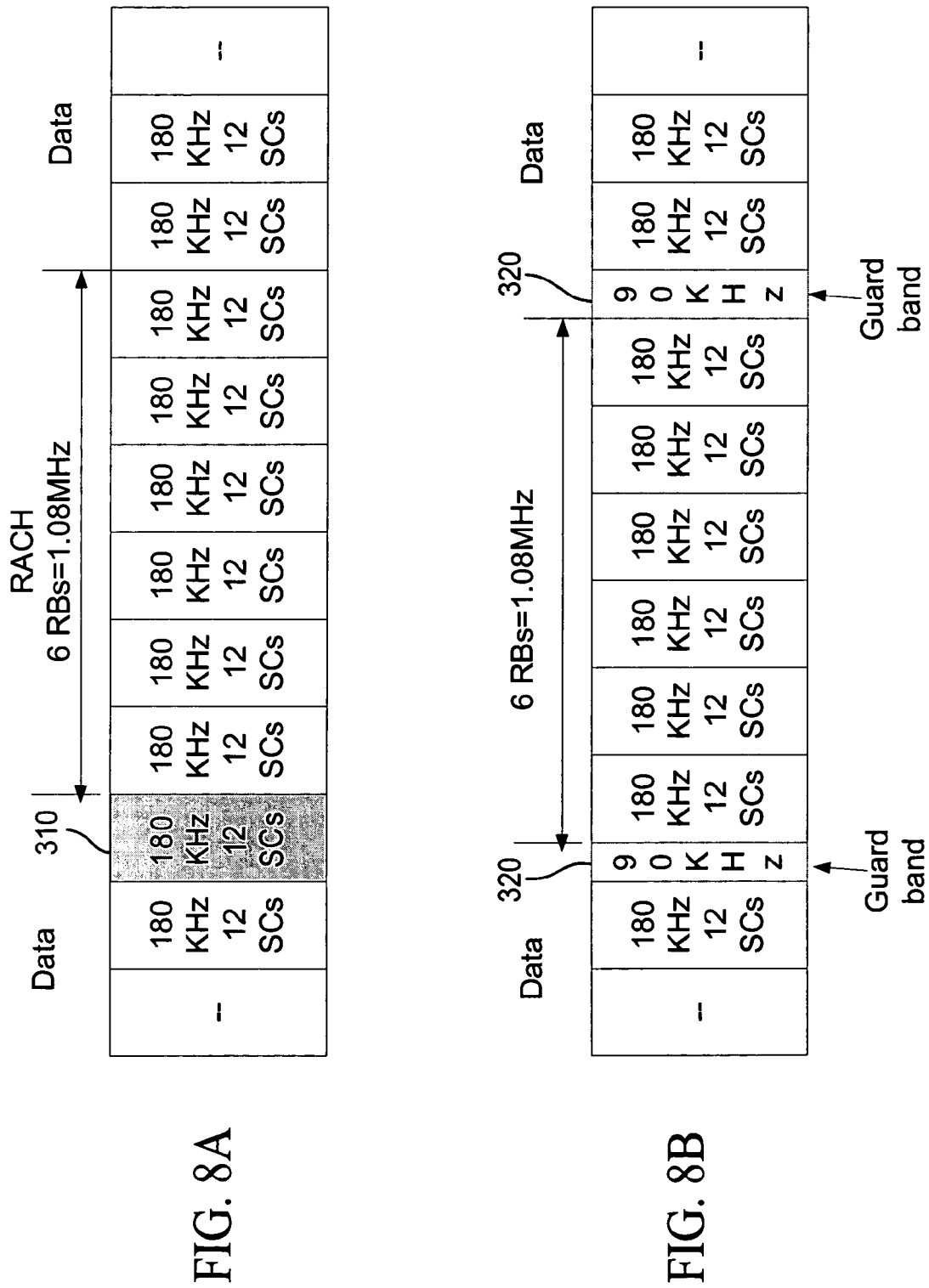
FIG. 8A illustrates an uplink channel using a data resource block around a random access channel to create a guard band.
FIG. 8B illustrates shifting the random access channel to create two guard bands in accordance with an embodiment of the principles of the present invention.

In one embodiment according to the principles of the current invention shown in FIG. 8A, a data resource block 310 of 180 KHz, which includes twelve sub-carriers of 15 KHz each, is used to create guard sub-bands for the RACH channel. As shown in FIG. 8B, the RACH frequency is shifted by 90 KHz (6 sub-carriers of 15 KHz each) to place the RACH in the middle after creating 90 KHz guard sub-bands 320 on each side.

Figure 9:
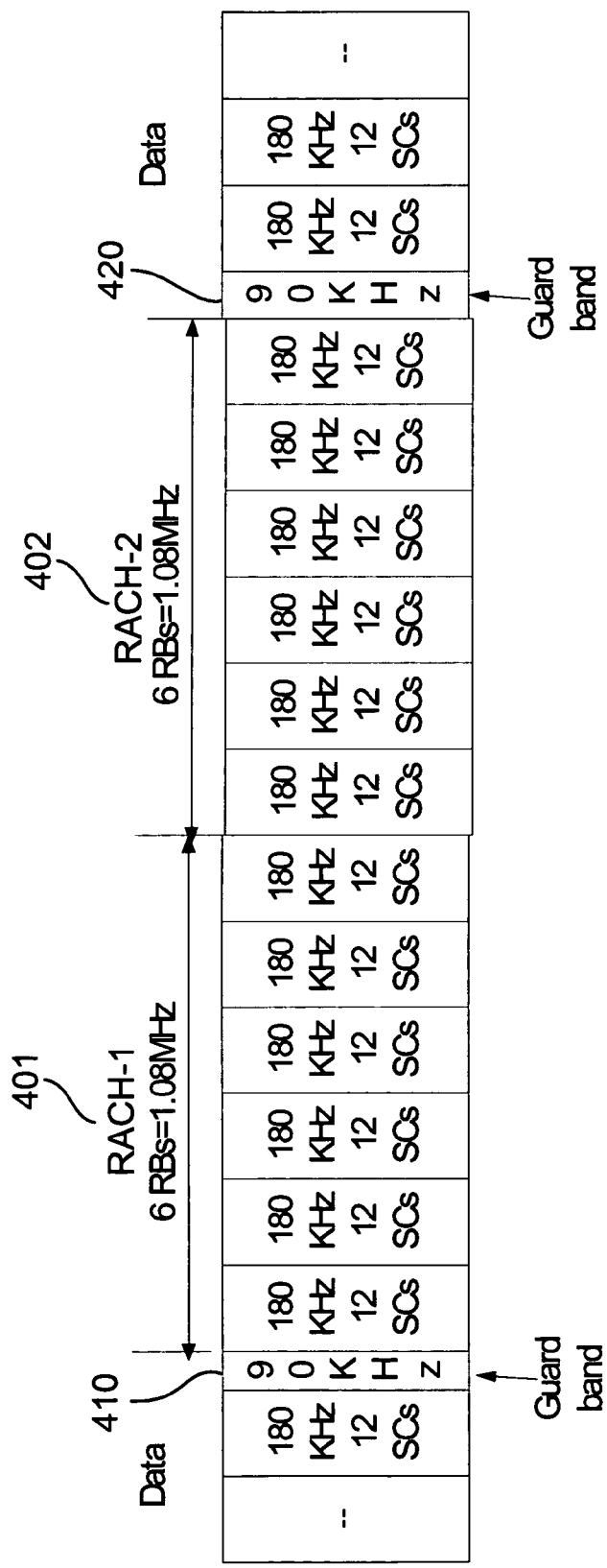
FIG. 9 illustrates an uplink channel including two random access channels and two guard bands created from one data resource block in accordance with another embodiment of the principles of the present invention.

In case of more than one RACH channel, the guard sub-bands overhead does not need to be doubled because there is no need for guard sub-bands between two RACH channels. As shown in FIG. 9, two RACH channels RACH-1 401 and RACH-2 402 are allocated in the uplink channel. Two guard sub-bands 410 and 420 are allocated at each side of the combination of RACH channels RACH-1 401 and RACH-2 402.

As described above, the method for non-synchronized transmission in accordance with the principles of the present invention applies channel filtering on random access channels using a raised cosine filter with roll-off coefficient 0.12.

The roll-off coefficient 0.12 balances the needs to reduce or eliminate the interference of the RACH to its neighboring data sub-carriers and to avoid the over-reduction of the RACH processing gain.

The method of the present invention further uses data sub-carriers around the random access channel(s) as guard band.

When more than one RACH is allocated, the method of the present invention uses data sub-carriers for guard band to maximize the RACH processing gain and to efficiently utilize the frequency resources.

Although exemplary embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A method for communication, the method comprising
   selecting a sequence from a group of sequences for random access;
   allocating at least one sub-carrier on an uplink channel for at least one random access channel (RACH), the uplink channel comprising at least one data channel, and each data channel comprising a continuous set of data sub-carriers;
   creating a guard band on each side of the at least one RACH by applying a raised cosine filter before transmitting the selected sequence using the RACH, wherein creating the guard band on each side of the at least one RACH further comprises:
      for each continuous set of multiple RACHs among the at least one RACH, applying the raised cosine filter to a first frequency bandwidth that corresponds to a combination of a first set of sub-carriers adjacent to a first side of the continuous set of multiple RACHs, the continuous set of multiple RACHs, and a second set of sub-carriers adjacent to a second side of the continuous set of multiple RACHs;
   mapping the selected sequence to the at least one RACH to generate a at least one RACH signal; and
   transmitting the at least one RACH signal to a base station.

2. The method of claim 1, the raised cosine filter having a roll-off coefficient of approximately 0.12.

3. The method of claim 1, wherein creating the guard band on each side of the at least one RACH further comprises:
   for each non-continuous RACH among the at least one RACH, applying the raised cosine filter to a second frequency bandwidth that corresponds to the non-continuous RACH.

4. The method of claim 3, the raised cosine filter having a roll-off coefficient of approximately 0.12.

5. The method of claim 1, wherein at least one of the first set of sub-carriers and the second set of sub-carriers comprises at least a portion of a data channel adjacent to the continuous set of multiple RACHS.

6. The method of claim 1, the group of certain sequences comprising a Zadoff-Chu sequence and a Generalized Chirp-Like sequence.

7. A wireless terminal comprising:
   a transmitter configured to transmit signals to a base station over an uplink channel; and
   a processor configured to:
      select a sequence from a group of certain sequences,
      allocate at least one subcarrier on the uplink channel for at least one random access channel (RACH), the uplink channel comprising at least one data channel, and each data channel comprising a continuous set of data sub-carriers,
      create a guard band on each side of the at least one RACH by applying a raised cosine filter before transmitting the selected sequence using the RACH, wherein to create the guard band on each side of the at least one RACH the processor is further configured to, for each continuous set of multiple RACHs among the at least one RACH, apply the raised cosine filter to a second frequency bandwidth that corresponds to a combination of a first set of data sub-carriers adjacent to a first side of the continuous set of multiple RACHs, the continuous set of multiple RACHs, and a second set of data sub-carriers adjacent to a second side of the continuous set of multiple RACHs,
      map the selected sequence to the at least one RACH to generate a RACH signal, and
      control the transmitter to transmit the RACH the base station.

8. The wireless terminal of claim 7, the raised cosine filter having a roll-off coefficient of approximately 0.12.

9. The wireless terminal of claim 7, wherein to create the guard band on each side of the at least on RACH, the processor is further configured to:
   for each non-continuous RACH among the at least one RACH, apply the raised cosine filter to a first frequency bandwidth that corresponds to the non-continuous RACH.

10. The wireless terminal of claim 9, the raised cosine filter having a roll-off coefficient of approximately 0.12.

11. The wireless terminal of claim 7, wherein at least one of the first set of sub-carriers and the second set of sub-carriers comprises at least a portion of a data channel adjacent to the continuous set of multiple RACHS.

12. The wireless terminal of claim 7, the group of certain sequences comprising a Zadoff-Chu sequence and a Generalized Chirp-Like sequence.

13. A wireless communication system comprising:
   a first wireless communication device configured to:
      select a sequence from a group of certain sequences;
      allocate at least one sub-carrier on an uplink channel for at least one random access channel (RACH), the uplink channel comprising at least one data channel, and each data channel comprising a continuous set of data sub-carriers,
      create a guard band on each side of the at least one RACH by applying a raised cosine filter before transmitting the selected sequence on the RACH, wherein to create the guard band on each side of the at least on RACH, the first wireless communication device is further configured to, for each continuous set of multiple RACHs among the at least one RACH, apply the raised cosine filter to a second frequency bandwidth that corresponds to a combination of a first set of data sub-carriers adjacent to a first side of the continuous set of multiple RACHs, the continuous set of multiple RACHs, and a second set of data sub-carriers adjacent to a second side of the continuous set of multiple RACHs, map the selected sequence to the at least one RACH to generate a RACH signal, and transmit the RACH signal; and a second wireless communication device configured to receive the RACH signal comprising the selected sequence, and transmit timing synchronization information to the first wireless communication device.

14. The wireless communication system of claim 13, the Raised Cosine filter having a roll-off coefficient of approximately 0.12.

15. The wireless communication system of claim 13, wherein to create the guard band on each side of the at least on RACH, the first wireless communication device is further configured to:

for each non-continuous RACH among the at least one RACH, apply the raised cosine filter to a first frequency bandwidth that corresponds to the non-continuous RACH.

16. The wireless communication system of claim 15, the Raised Cosine filter having a roll-off coefficient of approximately 0.12.

17. The wireless communication system of claim 15, wherein at least one of the first set of sub-carriers and the second set of sub-carriers comprises at least a portion of a data channel adjacent to the continuous set of multiple RACHS.

18. The wireless communication system of claim 13, the group of certain sequences comprising a group of a Zadoff-Chu sequence and a Generalized Chirp-Like sequence.

19. The wireless communication system of claim 13, wherein the timing synchronization information comprises timing advance information.

20. The wireless communication system of claim 13, wherein the first wireless communication device is further configured to receive the timing synchronization information, adjusts an uplink timing using the timing synchronization information, and send an uplink scheduling request to the second wireless communication device.

* * * * *